(12) United States Patent
Cho et al.

(10) Patent No.: US 10,662,588 B2
(45) Date of Patent: May 26, 2020

(54) FRICTION APPARATUS

(71) Applicant: KOREA RAILROAD RESEARCH INSTITUTE, Uiwang-si (KR)

(72) Inventors: Yong Hyeon Cho, Seoul (KR); Jin Yu Choi, Seongnam-si (KR); Yun Suk Kang, Yongin-si (KR); Joo Uk Kim, Bucheon-si (KR)

(73) Assignee: KOREA RAILROAD RESEARCH INSTITUTE (KR)

( * ) Notice: Subject to any disclaimer, the term of this patent is extended or adjusted under 35 U.S.C. 154(b) by 214 days.

(21) Appl. No.: 15/580,354

(22) PCT Filed: May 19, 2016

(86) PCT No.: PCT/KR2016/005311
§ 371 (c)(1),
(2) Date: Dec. 7, 2017

(87) PCT Pub. No.: WO2016/200073
PCT Pub. Date: Dec. 15, 2016

(65) Prior Publication Data
US 2018/0148897 A1 May 31, 2018

(30) Foreign Application Priority Data
Jun. 10, 2015 (KR) ........................ 10-2015-0081898

(51) Int. Cl.
*E01B 5/08* (2006.01)
*B61C 15/08* (2006.01)
(Continued)

(52) U.S. Cl.
CPC ................ *E01B 5/08* (2013.01); *B60B 17/00* (2013.01); *B60B 19/00* (2013.01); *B60B 21/08* (2013.01);
(Continued)

(58) Field of Classification Search
CPC ........... E01B 5/08; B60B 19/00; B61C 15/08; B61H 11/00
See application file for complete search history.

(56) References Cited

U.S. PATENT DOCUMENTS

| 9,908,545 B2 * | 3/2018 | Peltz ..................... B61L 25/021 |
| 2010/0200127 A1 * | 8/2010 | Sokolov .................. C21D 9/34 148/566 |

(Continued)

FOREIGN PATENT DOCUMENTS

| CN | 101929114 A | 12/2010 |
| EP | 0116359 A2 | 8/1984 |

(Continued)

OTHER PUBLICATIONS

European Extended Search Report dated Mar. 22, 2018 for Application No. 1680714.7.
International Search Report dated Aug. 24, 2016—PCT/KR2016/005311.

*Primary Examiner* — Jason C Smith
(74) *Attorney, Agent, or Firm* — Schmeiser, Olsen & Watts, LLP

(57) ABSTRACT

A friction apparatus is provided. The friction apparatus includes: a first member having a first surface; and a second member having a second surface that contacts the first surface, and moving while in contact with the first member, wherein at least one of the first surface and the second surface is hardened.

15 Claims, 12 Drawing Sheets

(51) Int. Cl.
   *B61H 11/00*   (2006.01)
   *E01B 5/02*    (2006.01)
   *B60B 17/00*   (2006.01)
   *B60B 21/08*   (2006.01)
   *C21D 10/00*   (2006.01)
   *C21D 9/34*    (2006.01)
   *C21D 9/04*    (2006.01)
   *B60B 19/00*   (2006.01)
   *C21D 1/09*    (2006.01)
   *C21D 1/10*    (2006.01)

(52) U.S. Cl.
   CPC .............. *B61C 15/08* (2013.01); *B61H 11/00* (2013.01); *C21D 9/04* (2013.01); *C21D 9/34* (2013.01); *C21D 10/005* (2013.01); *E01B 5/02* (2013.01); *C21D 1/09* (2013.01); *C21D 1/10* (2013.01); *Y02P 10/253* (2015.11)

(56) References Cited

U.S. PATENT DOCUMENTS

| 2016/0177513 A1* | 6/2016 | Ohata | E01B 5/14 |
| | | | 238/148 |
| 2018/0148897 A1* | 5/2018 | Cho | B61C 15/08 |

FOREIGN PATENT DOCUMENTS

| JP | 2005041417 A | 2/2005 |
| JP | 2010536646 A | 12/2010 |
| JP | 2015048640 A | 3/2015 |
| KR | 20040027754 A | 4/2004 |
| KR | 20120072501 A | 7/2012 |
| RU | 2153007 C1 | 7/2000 |
| WO | 95/09736 A1 | 4/1995 |
| WO | 99/29520 A1 | 6/1999 |

\* cited by examiner

FRICTION APPARATUS

CROSS-REFERENCE TO RELATED APPLICATIONS

This application claims priority to PCT Application No. PCT/KR2016/005311 having a filing date of May 19, 2016, based off of Korean Patent Application No. 10-2015-0081898, having a filing date of Jun. 10, 2015, the entire contents of all which are hereby incorporated by reference.

FIELD OF TECHNOLOGY

The following relates to a friction apparatus, and more particularly, to a friction apparatus capable of decreasing a distance of braking between a first member and a second member and reducing noise, wear, and friction energy generated between the first member and the second member by improving adhesion between the first member and the second member which are in contact with each other and move relative to each other.

BACKGROUND

Generally, in apparatuses in which relative motion is performed by using a frictional force in a state in which a plurality of apparatuses, such as a wheel member of a railway vehicle and a rail portion of a railway infrastructure, are in contact with each other, movements thereof can be accurately controlled when a frictional force which is greater than or equal to a predetermined value is secured.

Particularly, to stable drive a railway vehicle, an adhesion coefficient, which is a friction coefficient between a wheel member and a rail portion, has to be maintained to be greater than or equal to a predetermined value to secure a driving force, a braking force, and the like greater than or equal to predetermined levels.

However, since a conventional railway vehicle has a low adhesion coefficient between a wheel member and a rail portion, running performance, braking performance, and the like are lowered. Particularly, in the case in which the railway vehicle runs on a downwardly inclined section, slippage occurs, and thus there is a problem in that a braking distance is increased.

To reduce noise, wear, and friction energy between the wheel member and the rail portion, the adhesion coefficient, which is the friction coefficient between the wheel member and the rail portion, has to be within a predetermined range, and a positive friction state in which the friction coefficient increases even when a relative speed between the wheel member and the rail portion increases has to be maintained.

Conventionally, although a friction modifier has been applied to the wheel member and the rail portion such that the adhesion coefficient is within the predetermined range and the positive friction state is maintained, there have been problems in that the effect of the friction modifier is maintained only for a short period and an additional apparatus for applying the friction modifier has to be installed, and thus there is a need for reducing the problems.

SUMMARY

An aspect relates to a friction apparatus capable of simultaneously securing a braking distance, reducing slippage in an inclined section, and decreasing noise, wear, and friction energy of a railway vehicle and the like by improving adhesion between apparatuses configured to move relative to each other due to a frictional force.

One aspect of embodiments of the present invention provides a friction apparatus includes: a first member including a first surface; and a second member including a second surface in contact with the first surface and configured to move while in contact with the first member, wherein hardening treatments are performed on at least one of the first surface and the second surface.

The hardening treatment may be intermittently performed on the first surface or the second surface.

The first member may include one or more first hardened portions hardened by performing a heat treatment on the first surface.

A plurality of first hardened portions may be provided and disposed on the first surface.

The plurality of first hardened portions may be disposed to be spaced the same distance from each other.

A distance between the plurality of first hardened portions on the first surface may be greater than a length of a contact patch, which is an instant contact area between the first member and the second member.

A distance between the plurality of first hardened portions on the first surface may be less than a length of a contact patch, which is an instant contact area between the first member and the second member.

The second member may include one or more second hardened portions hardened by performing a heat treatment on the second surface.

A plurality of second hardened portions may be provided and disposed on the second surface.

The plurality of the second hardened portions on the second surface may be disposed to be spaced the same distance from each other.

A distance between the plurality of second hardened portions on the second surface may be greater than a length of a contact patch, which is an instant contact area between the first member and the second member.

A distance between the plurality of second hardened portions on the second surface may be less than a length of a contact patch, which is an instant contact area between the first member and the second member.

A friction coefficient between the first member and the second member may be adjusted by adjusting a distance between the plurality of first hardened portions or between the plurality of second hardened portions.

The first member may include a rail member including a rail portion.

The rail portion may include: a rail base portion coupled to a fixed object; a rail head portion including the first surface on which the first hardened portions are formed and configured to be in contact with the second member; and a rail connection portion which connects the rail base portion and the rail head portion.

The second member may include a wheel member configured to rotate while in contact with the first member.

The second member may include: an axle coupling portion coupled to an axle; a rail contact portion which surrounds the axle coupling portion and is in contact with the rail portion, and on which the second hardened portions are intermittently disposed; and a wheel flange portion formed to extend from the rail contact portion and configured to be in contact with a side surface of the rail portion.

The second hardened portions may be disposed on an outer circumferential surface of the rail contact portion in a circumferential direction.

The first member may include a rail member including a rail portion, and the second member may include a wheel member including a rail contact portion in contact with an upper surface of the rail portion, wherein the hardening treatments are performed on the first surface or the second surface in such a way that a friction coefficient between the upper surface of the rail portion and the rail contact portion is greater than 0.25 and less than 0.40.

A friction apparatus according to embodiments of the present invention can control an adhesion coefficient and reduce generation of wear and noise of an apparatus by applying intermittently spaced hardened portions to a first member or a second member which are in contact with each other and move relative to each other.

Since a pattern applied to hardened portions and a distance between the hardened portions are adjusted, an adhesion coefficient can be adjusted.

Since an adhesion coefficient at a sufficient level is maintained even when a relative speed between a first member and a second member is high such as in sudden braking, a railway vehicle and the like can stably run on an inclined section, and accidents can be prevented by securing a braking force in the case of an emergency.

Since a heat treatment is performed by using a plurality of lasers, a hardening treatment can be performed by using a low power output laser emitting apparatus.

Since a heat treatment is performed by induction heating, a hardening treatment which can adjust an area, a length, or a width of hardened portions, a distance therebetween, or the like by adjusting a shape of an induction coil of an induction heating apparatus which is used or an output and frequency of a high-frequency current thereof can be performed.

In embodiments of the present invention, since first hardened portions or second hardened portions are applied to the friction apparatus, a plastic flow of a rail portion or a second member which may occur due to sudden braking or acceleration can be suppressed, and thus a wear resistance and a fatigue resistance can be improved.

By letting a distance between a plurality of first hardened portions or between a plurality of second hardened portions be less than a longitudinal length of a region of a contact patch, rolling noises of a first member or a second member can be reduced due to the contact filter effect in which the noise is reduced in the case in which a size of an irregularity is smaller than the contact patch between the first member and the second member.

By letting a distance between central portions of adjacent first hardened portions or central portions of adjacent second hardened portions be greater than a longitudinal length of a contact patch of a rail member, which is a first member, and a wheel member, which is a second member, an adhesion coefficient between the rail member and the wheel member can be adjusted to a reduced range and be maintained to be a positive friction state in which a friction coefficient increases as a relative speed between the wheel member and a rail portion increases can be maintained, and thus noise, wear, and friction energy generated between the wheel member and the rail member can be reduced.

BRIEF DESCRIPTION

Some of the embodiments will be described in detail, with reference to the following figures, wherein like designations denote like members, wherein.

Figure 12A:
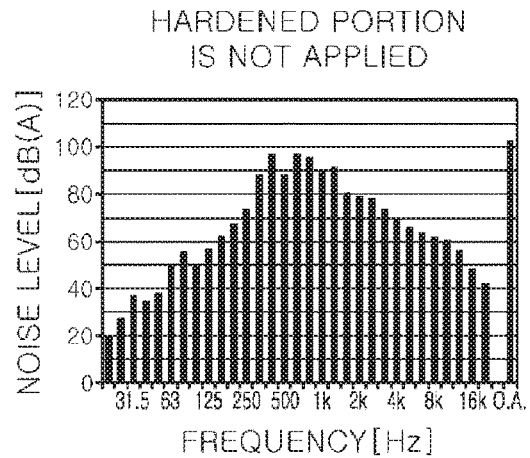
FIG. 12A shows a first comparative graph showing noise levels according to whether the hardened portions are not applied to the friction apparatus and the distance when a slip ratio of the friction apparatus according to one embodiment of the present invention is 2%.
Figure 12B:
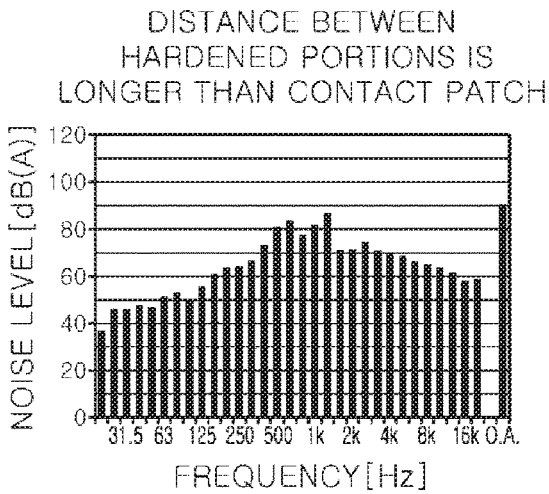
Figure 12C:
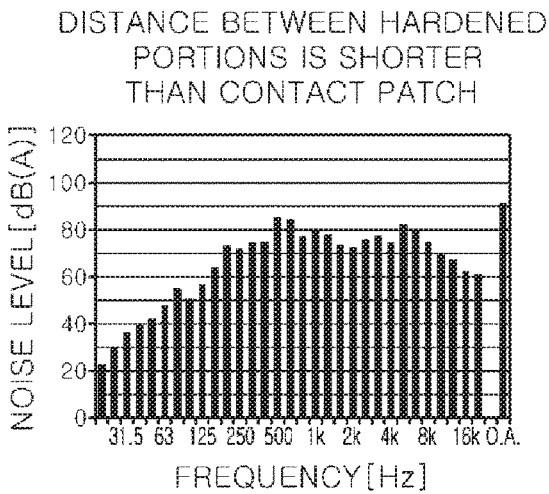

FIG. 12B shows a second comparative graph showing noise levels according to whether the distance between the hardened portions are longer than contact patch according to one embodiment of the present invention; and FIG. 12C shows a third comparative graph showing noise levels according to whether the distance hardened portions are shorter than contact patch according to one embodiment of the present invention.

DETAILED DESCRIPTION

Hereinafter, embodiments of a friction device according to embodiments of the present invention will be described with reference to the accompanying drawings. In the description, thicknesses of lines, sizes of components, and the like illustrated in the drawings may be exaggerated for clarity and convenience of explanation.

In addition, the terms used herein are defined in consideration of functions in embodiments of the present invention, and the meanings thereof may vary depending on, for example, a user or operator's intentions or customs. Therefore, the meanings of the terms should be interpreted on the basis of the scope throughout this specification.

Figure 1:
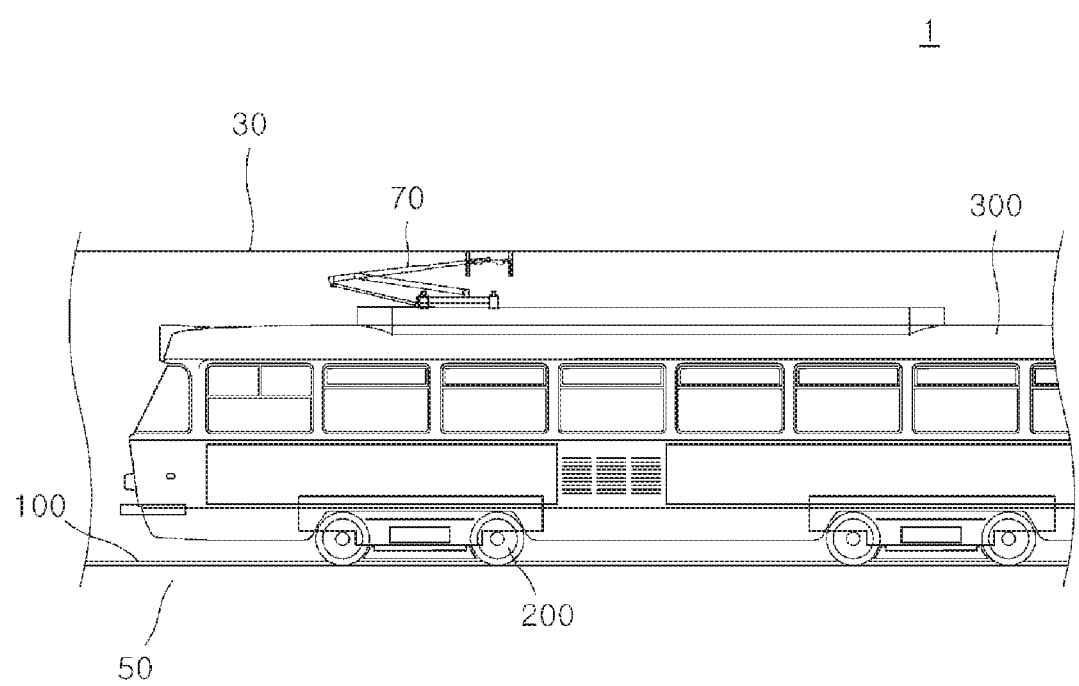
FIG. 1 is a schematic view illustrating an example of a friction apparatus according to one embodiment of the present invention.
Figure 2:
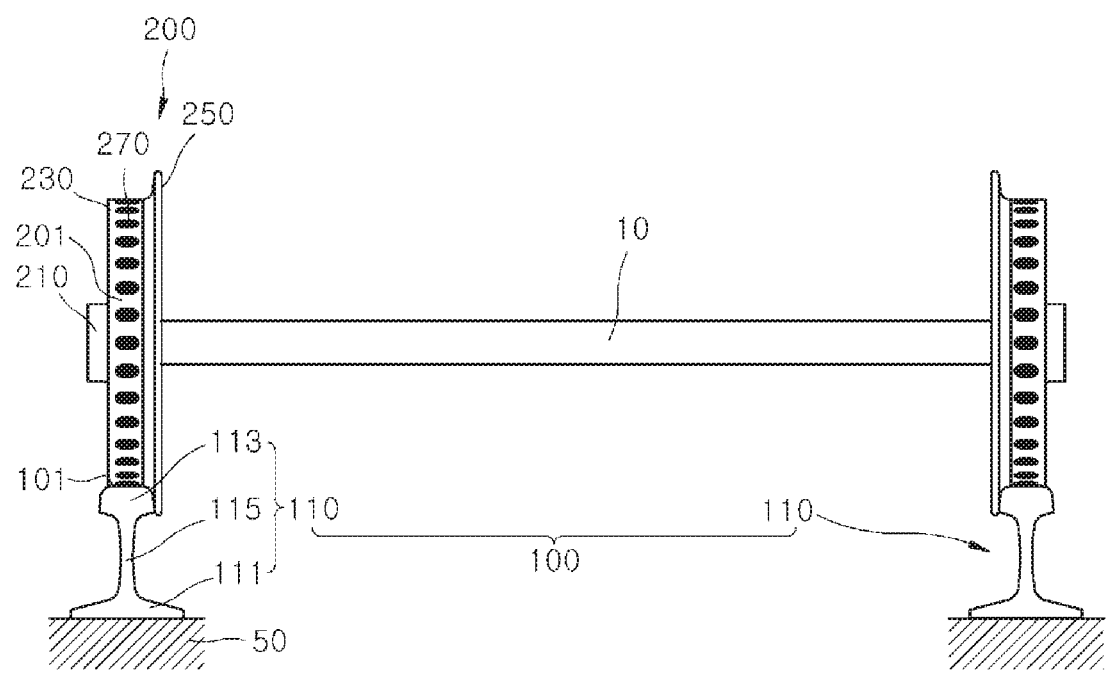
FIG. 2 is a view illustrating a state in which a first member and a second member are in contact with each other in the friction apparatus according to one embodiment of the present invention.

FIG. 1 is a schematic view illustrating an example of a friction apparatus according to one embodiment of the present invention, and FIG. 2 is a view illustrating a state in which a first member and a second member are in contact with each other in the friction apparatus according to one embodiment of the present invention.

Referring to FIGS. 1 and 2, a friction apparatus 1 according to one embodiment of the present invention includes a first member 100 and a second member 200 and is moved by creep forces between the first member 100 and the second member 200 in a state in which the second member 200 is in contact with the first member 100.

The first member 100 is illustrated as a rail member of a railway infrastructure including a first surface 101 and in contact with a second surface 201 of the second member 200, and the second member 200 includes the second surface 201 and is illustrated as a wheel member of the railway vehicle configured to move in a state in which the wheel member is in contact with the first surface 101 of the first member 100.

Figure 3:
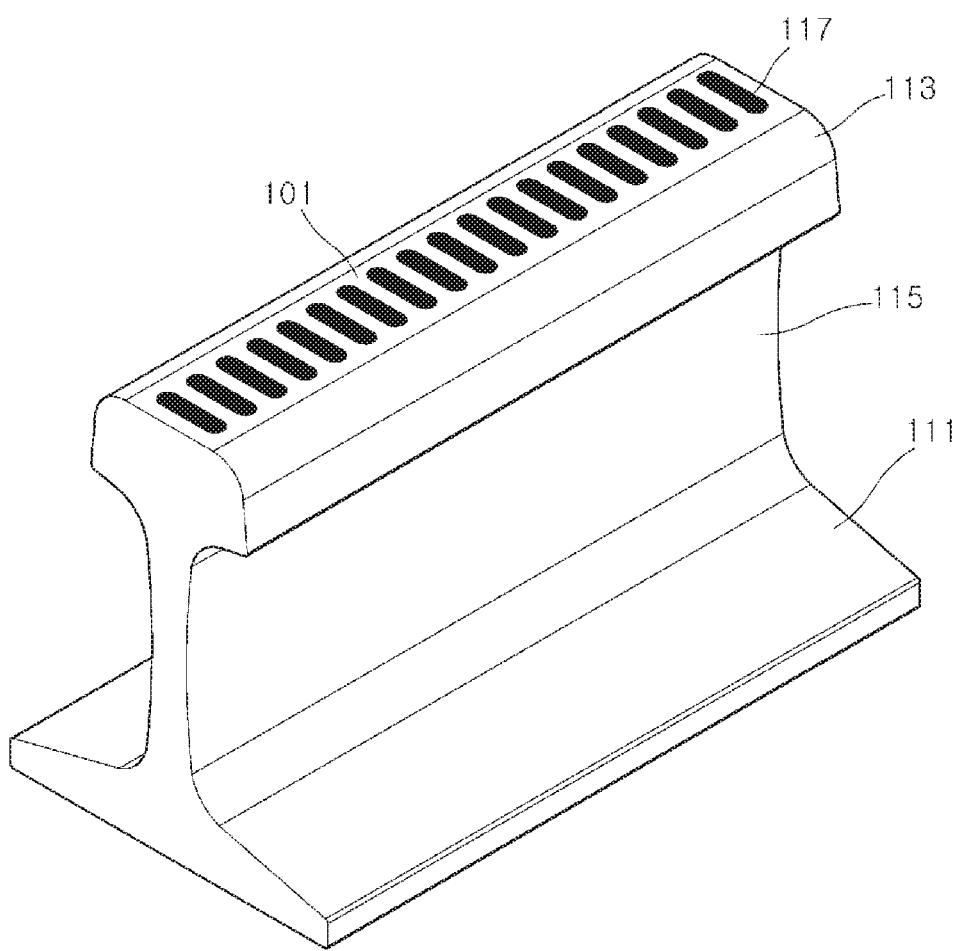
FIG. 3 is a view illustrating the first member in the friction apparatus according to one embodiment of the present invention.
Figure 4:
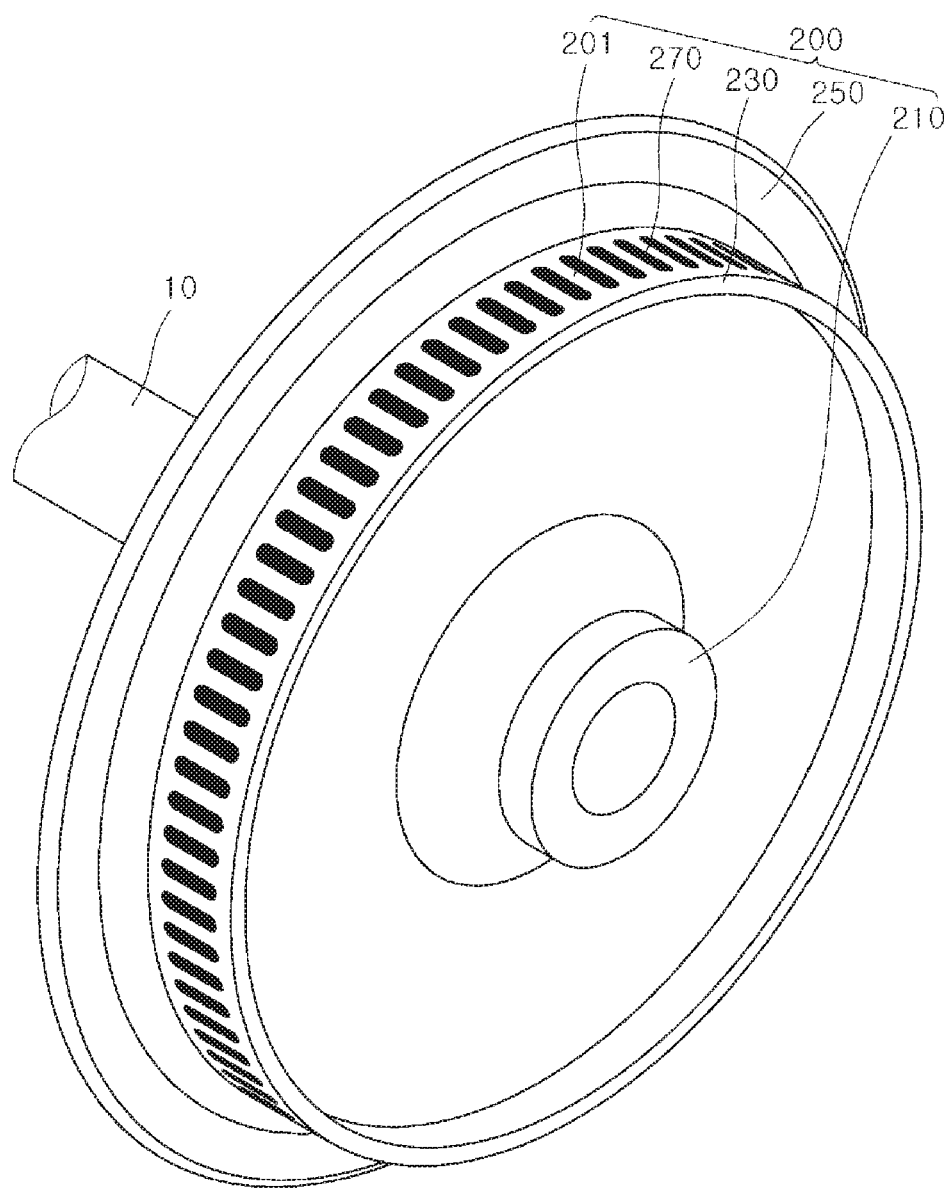
FIG. 4 is a view illustrating the second member in the friction apparatus according to one embodiment of the present invention.

FIG. 3 is a view illustrating the first member in the friction apparatus according to one embodiment of the present invention, and FIG. 4 is a view illustrating the second member in the friction apparatus according to one embodiment of the present invention.

Referring to FIGS. 3 and 4, a hardening treatment may be performed on at least one of the first surface 101 and the second surface 201 to improve friction performance between the first member 100 and the second member 200.

In the present embodiment, the first member 100 includes first hardened portions 117 hardened by heat treating the first surface 101. The first hardened portions 117 are formed by heat treating the first member 100 through a method in which a laser is emitted thereto or vibration is applied thereto.

Since a hardness of each of the hardened portions 117 and 270 formed by the hardening treatment is greater than that of a portion on which the hardening treatment is not performed, the hardened portions 117 and 270 may serve not only to increase a frictional force between the first member 100 and the second member 200, but also reduce wear of the first member 100 by preventing dislocations of the unhardened portion on the first member 100 which are caused by the friction between the first member 100 and the second member 200.

In the present embodiment, as a plurality of first hardened portions 117 are arranged on the first surface 101 to be spaced apart by the same distance, the frictional force against the second member 200 is uniformly distributed, and thus partial wear and the like of the first member 100 are prevented.

Figure 5:
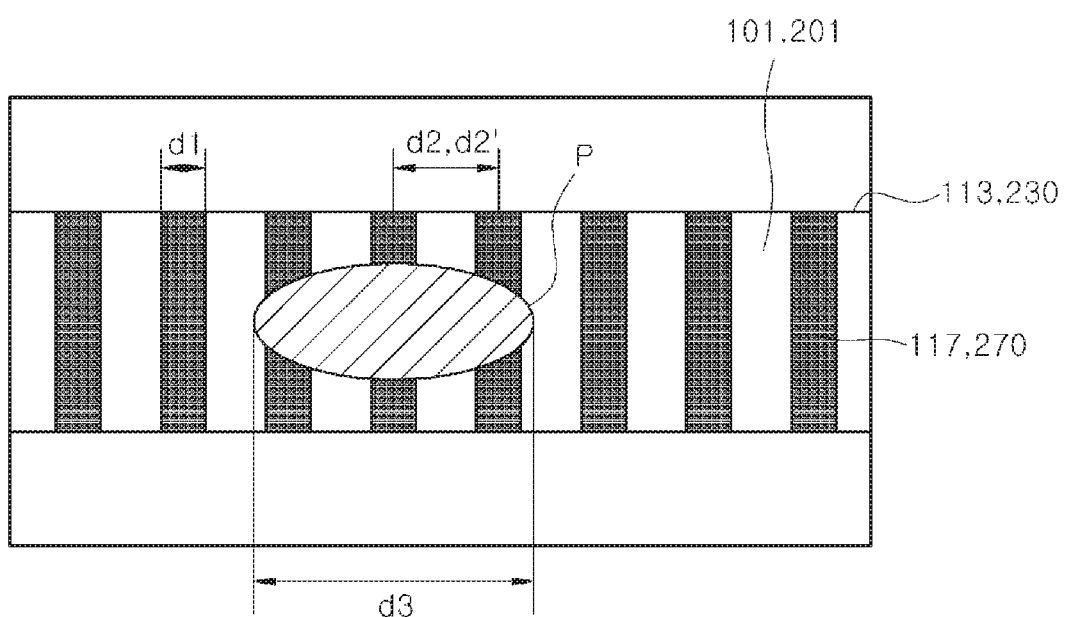
FIG. 5 is a view illustrating a state in which a distance between hardened portions is less than a length of a contact patch in the friction apparatus according to one embodiment of the present invention.
Figure 6:
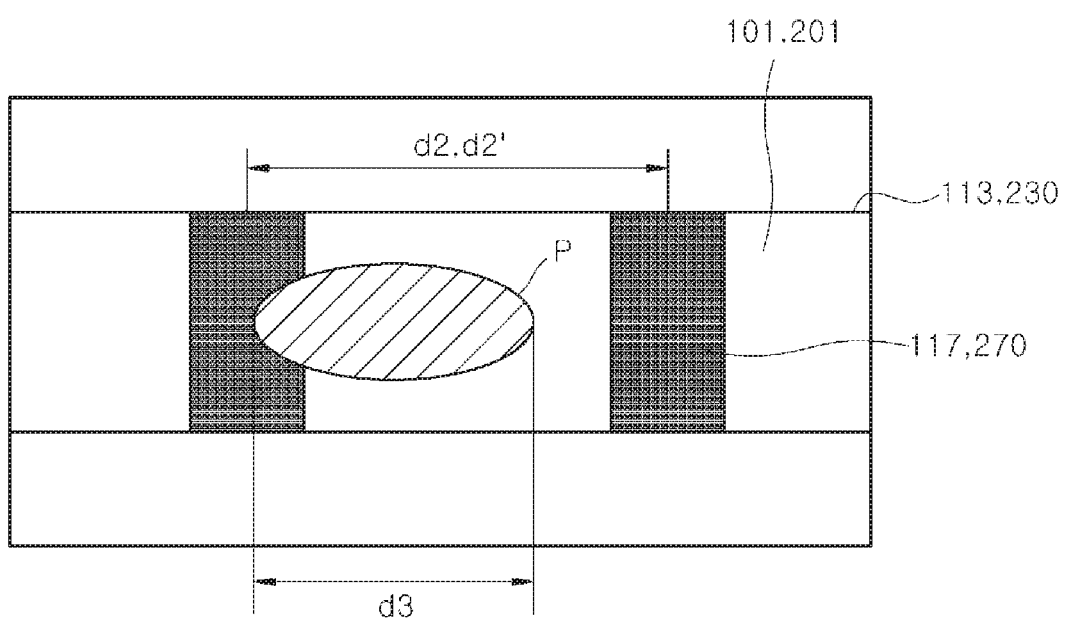
FIG. 6 is a view illustrating a state in which the distance between hardened portions is greater than the length of the contact patch in the friction apparatus according to one embodiment of the present invention.
Figure 7:
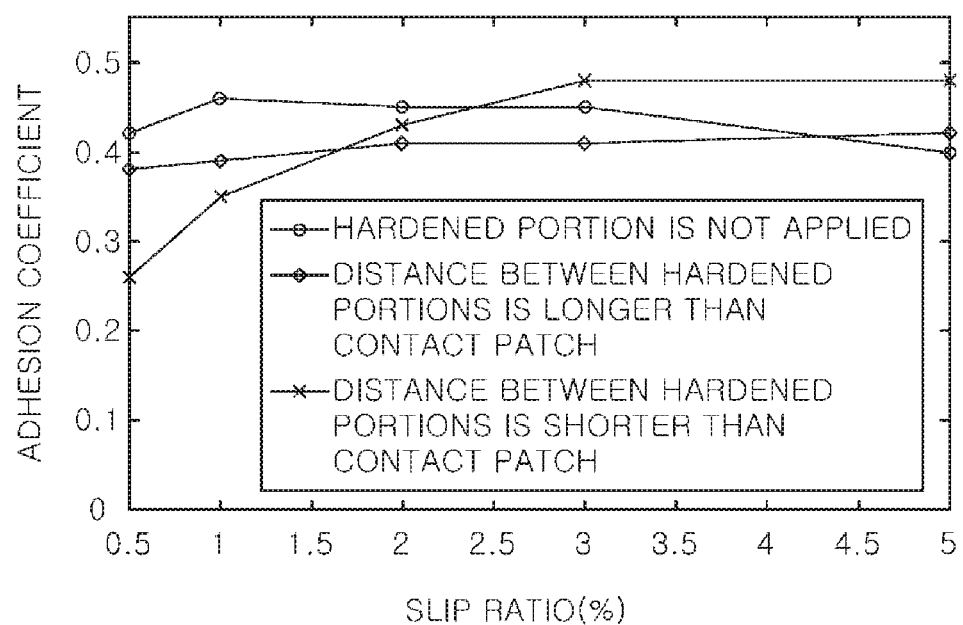
FIG. 7 is a view illustrating a change in an adhesion coefficient according to an increase in a slip ratio on the basis of whether the hardened portions are applied and the distance between the hardened portions.

FIG. 5 is a view illustrating a state in which a distance between the hardened portions is less than a length of a contact patch in the friction apparatus according to one embodiment of the present invention, FIG. 6 is a view illustrating a state in which the distance between hardened portions is greater than the length of the contact patch in the friction apparatus according to one embodiment of the present invention, and FIG. 7 is a view illustrating a change in an adhesion coefficient according to an increase in a slip ratio on the basis of whether the hardened portions are applied and the distance between the hardened portions.

Referring to FIGS. 5 and 7, in a first embodiment, a distance d2 between the first hardened portions 117 may be less than a length d3 of a contact patch P, which is an instant contact area between the first member 100 and the second member 200.

In the case in which the distance d2 between the first hardened portions 117 is less than the length d3 of the contact patch P, a positive friction state in which an adhesion coefficient increases even when a slip ratio increases (see FIG. 7) is maintained.

In the case in which the distance d2 between the first hardened portions 117 is less than the length d3 of the contact patch P, which is the instant contact area between the first member 100 and the second member 200, since the adhesion coefficient is maintained in the positive friction state, noise and corrugation may be reduced, and a driving force or a braking force may be prevented from falling below a set value, and thus the railway vehicle may be prevented from slipping on an inclined section and the like in the case in which embodiments of the present invention is applied to the rail member of the railway infrastructure or the wheel member of the railway vehicle and the like.

Referring to FIGS. 6 and 7, in a second embodiment, a distance d2 between first hardened portions 117 may be greater than a length d3 of a contact patch P, which is an instant contact area between a first member 100 and a second member 200.

In the case in which the distance d2 between the first hardened portions 117 is greater than the length d3 of the contact patch P, a positive friction state in which an adhesion coefficient increases as a slip ratio increases may be maintained, and a variation range of the adhesion coefficient may also decrease (see FIG. 7).

In the case in which the distance d2 between the first hardened portions 117 is greater than the length d3 of the contact patch P, which is the instant contact area between the first member 100 and the second member 200, since the adhesion coefficient is maintained in the positive friction state, noise and corrugation may be prevented, and a driving force or braking force is prevented from falling below a set value, and thus a railway vehicle may be prevented from slipping on an inclined section and the like in the case in which embodiments of the present invention is applied to a rail member of the railway infrastructure or a wheel member of the railway vehicle and the like.

In addition, in the case in which the distance d2 between the first hardened portions 117 is greater than the length d3 of the contact patch P, which is the instant contact area between the first member 100 and the second member 200, since a sudden increase of the adhesion coefficient is prevented even when the slip ratio increases, a range of the adhesion coefficient may be maintained within a set range, and thus wear of the first member 100 or the second member 200 due to an excessive increase in the adhesion coefficient may be prevented.

In the present embodiment, the second member 200 includes second hardened portions 270 hardened by heat treating a second surface 201. The second hardened portions 270 are formed by heat treating the second member 200 through a method in which a laser is emitted thereto or vibration is applied thereto.

Since a hardness of the second hardened portions 270 are also greater than that of a portion in which a hardening treatment is not performed on the second surface 201, a dislocation of the unhardened portion due to friction with the first member 100 is prevented to decrease a dislocation level, and thus wear of the second member 200 may be prevented.

In the present embodiment, as a plurality of second hardened portions 270 are disposed on the second surface 201 to be spaced apart by the same distance, a frictional force against the first member 100 is uniformly distributed, and thus partial wear of the second member 200 is prevented.

Referring to FIGS. 5 and 7, in the first embodiment, a distance d2' between the second hardened portions 270 may be less than the length d3 of the contact patch P, which is the instant contact area between the first member 100 and the second member 200.

In the case in which the distance d2' between the second hardened portions 270 is less than the length d3 of the contact patch P, the positive friction state in which the adhesion coefficient increases even when the slip ratio increases is maintained (see FIG. 7).

In the case in which the distance d2' between the second hardened portions 270 is less than the length d3 of the contact patch P, which is the instant contact area between the first member 100 and the second member 200, since the adhesion coefficient is maintained in the positive friction state, noise and corrugation may be prevented, the driving force or the braking force may be prevented from falling below the set value, and thus the railway vehicle may be prevented from slipping on an inclined section and the like in the case in which embodiments of the present invention is applied to the rail member of the railway infrastructure or the wheel member of the railway vehicle and the like.

Referring to FIGS. 6 and 7, in the second embodiment, a distance d2' between the second hardened portions 270 may be greater than the length d3 of the contact patch P, which is the instant contact area between the first member 100 and the second member 200.

In the case in which the distance d2' between the second hardened portions 270 is greater than the length d3 of the contact patch P, the positive friction state in which the adhesion coefficient increases as the slip ratio increases is maintained and the variation range of the adhesion coefficient may also be decreased (see FIG. 7).

In the case in which the distance d2' between the second hardened portions 270 is greater than the length d3 of the contact patch P, which is the instant contact area between the first member 100 and the second member 200, since the adhesion coefficient is maintained in the positive friction state, noise and corrugation may be prevented, the driving force or the braking force is prevented from falling below the set value, and thus the railway vehicle may be prevented from slipping on an inclined section and the like in the case in which embodiments of the present invention is applied to the rail member of the railway infrastructure or the wheel member of the railway vehicle and the like.

In addition, in the case in which the distance d2' between the second hardened portions 270 is greater than the length d3 of the contact patch P, which is the instant contact area between the first member 100 and the second member 200, since a sudden increase of the adhesion coefficient is prevented even when a slip ratio increases, the range of the adhesion coefficient may be maintained within the set range, and thus wear of the first member 100 or the second member 200 due to an excessive increase in the adhesion coefficient may be prevented.

In the friction apparatus 1 according to the present embodiment, a frictional force or adhesion between the first member 100 and the second member 200 may be controlled by adjusting the distance between the plurality of first hardened portions 117 or between the plurality of second hardened portions 270.

Referring to FIG. 7, in the case in which the hardened portions 117 and 270 are not applied to the first member 100 and the second member 200 with a relative speed of 50 km/h between the first member 100 and the second member 200, when a slip ratio is in the range of 0.5 to 5%, an adhesion coefficient is in the range of 0.4 to 0.5, but the positive friction state in which the adhesion coefficient increases as the slip ratio increases is not maintained, when the slip ratio is greater than 1%.

However, in the case in which the hardened portions 117 and 270 are respectively applied to the first member 100 and the second member 200, and particularly, in the case in which the distance between the hardened portions 117 and 270 is shorter than the contact patch P, the positive friction state in which the adhesion coefficient increases even though the slip ratio is greater than 1% may be maintained, the frictional force and the braking force may be maintained to prevent slip, and thus generation of noise and corrugation may be prevented.

In addition, in the case in which the distance between the hardened portions 117 and 270 is longer than the contact patch P, the positive friction state in which the adhesion coefficient increases even though the slip ratio is greater than 1% may be maintained and a sudden increase of the adhesion coefficient may be prevented, and thus wear between the first member 100 and the second member 200 may be prevented.

In the present embodiment, the first member 100 illustrated as the rail member including a pair of rail portions 110 and the second member 200 illustrated as the wheel member which rotates while in contact with the first member 100 may be applied to the railway vehicle and the like.

In the present embodiment, each rail portion 110 is formed of a metal material and fixed to a fixed object 50. In the present embodiment, the rail portion 110 includes a rail base portion 111, a rail head portion 113, and a rail connection portion 115.

The rail base portion 111 is coupled to the fixed object 50 through a sleeper and the like via a bolting method and the like to support the rail head portion 113 and the rail connection portion 115.

The rail head portion 113 is in contact with the wheel member, which is the second member 200 and includes the first hardened portions 117 intermittently formed by heat treating the first surface 101, which is an upper surface thereof. That is, the rail head portion 113 includes the first hardened portions 117 having a hardness that is improved by heating the rail head portion 113 containing an iron (Fe) and carbon (C) compound.

In the present embodiment, the first hardened portions 117 are disposed in a longitudinal direction of the rail portion 110. Since the hardness of each of the first hardened portion 117 is greater than that of a portion at which the heat treatment is not performed in the rail head portion 113, the first hardened portion 117 serves as a protrusion when in contact with the second member 200 illustrated as the wheel member to increase a stick zone between the first member 100 and the second member 200.

Figure 8:
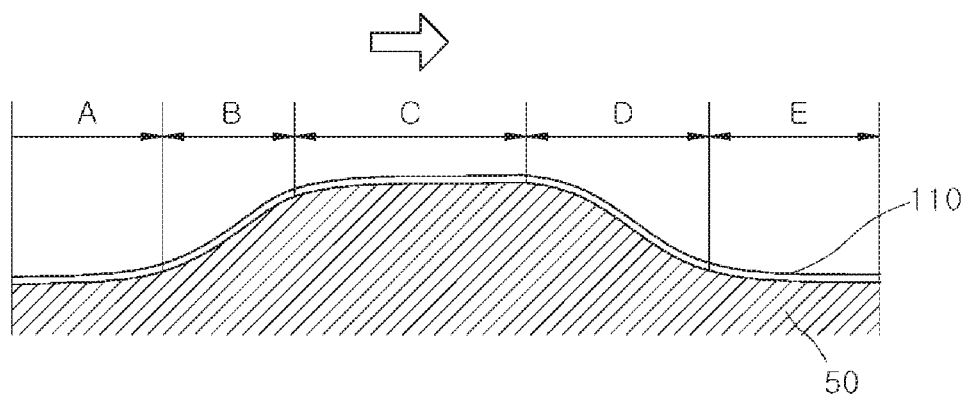
FIG. 8 is a view illustrating a section of a first member to which a first hardened portion is applied in the friction apparatus according to one embodiment of the present invention.

FIG. 8 is a view illustrating a section of the first member to which a first hardened portion is applied in the friction apparatus according to one embodiment of the present invention.

Referring to FIG. 8, the first hardened portion 117 may be applied to inclined sections B and D of the rail portion 110. The inclined sections B and D of the rail portion 110 are divided into the upward section B in which a height increases and the downward section D in which a height decrease in a direction in which a vehicle body member 300 moves.

In the upward section B, since a force is applied to the vehicle body member 300 in a direction opposite the direction in which the vehicle body member 300 moves due to gravity being applied to the vehicle body member 300, a case in which the second member 200 slips on the rail portion 110 may occur when the second member 200 is stopped and the like, and thus there is a need to increase a frictional force between the second member 200 and the rail portion 110.

In addition, in the downward section D, since a force is applied to the vehicle body member 300 in the direction in which the vehicle body member 300 moves due to gravity being applied to the vehicle body member 300, a braking distance in the downward section D may be greater than those in horizontal sections A, C, and E, and thus there is a need to increase the frictional force between the second member 200 and the rail portion 110.

The rail connection portion 115 connects the rail base portion 111 to the rail head portion 113. In the present embodiment, the rail base portion 111, the rail head portion 113, and the rail connection portion 115 are integrally formed of a steel material composed of a compound of iron (Fe), carbon (C), and the like.

Referring to FIGS. 2 to 4, the second member 200 illustrated as the wheel member is in contact with the first member 100 illustrated as the rail member, rotates, and moves the vehicle body member 300 on the first member 100. In the present embodiment, the second member 200 includes an axle coupling portion 210, a rail contact portion 230, and a wheel flange portion 250.

An axle 10 is coupled to the axle coupling portion 210. In the present embodiment, the axle 10 is insertion-coupled to the axle coupling portion 210, and the axle coupling portion 210 rotates with the axle 10.

The rail contact portion 230 is formed in a shape which surrounds the axle coupling portion 210, is in contact with the rail portion 110, includes the second surface 201 on which the second hardened portions 270 are formed, and is in contact with the first surface 101. The second hardened portions 270 are intermittently formed on the second surface 201. In the present embodiment, the second hardened portions 270 are disposed on and along an outer circumferential surface of the rail contact portion 230 in a circumferential direction.

The wheel flange portion 250 extends outward from the rail contact portion 230 and is in contact with a side surface of the rail portion 110.

In the friction apparatus 1 according to the present embodiment, a hardening treatment may be performed on the first surface 101 or the second surface 201 in such a way that a friction coefficient between the upper surface of the rail portion 110 and the rail contact portion 230 is greater than 0.25 and less than 0.40.

In the case in which the friction coefficient between the upper surface of the rail portion 110 and the rail contact portion 230 is 0.25 or less, since a driving force which drives the railway vehicle or a braking force which brakes the railway vehicle may not be sufficiently secured, there is a problem in that it is difficult to control the railway vehicle.

In addition, in the case in which the friction coefficient between the upper surface of the rail portion 110 and the rail contact portion 230 is 0.40 or more, much wear between the upper surface of the rail portion 110 and the rail contact portion 230 occurs. Accordingly, in the friction apparatus 1 according to the present embodiment, the first surface 101 or the second surface 201 is adjustably hardened in such a way that the friction coefficient between the upper portion of the rail portion 110 and the rail contact portion 230 is greater than 0.25 and less than 0.40.

Such an adjustment degree of the hardening treatment may be achieved by adjusting an area, a length d1, or a width of each of the hardened portions 117 and 270 or by adjusting the distance and the like between the hardened portions 117 and 270.

Figure 9:
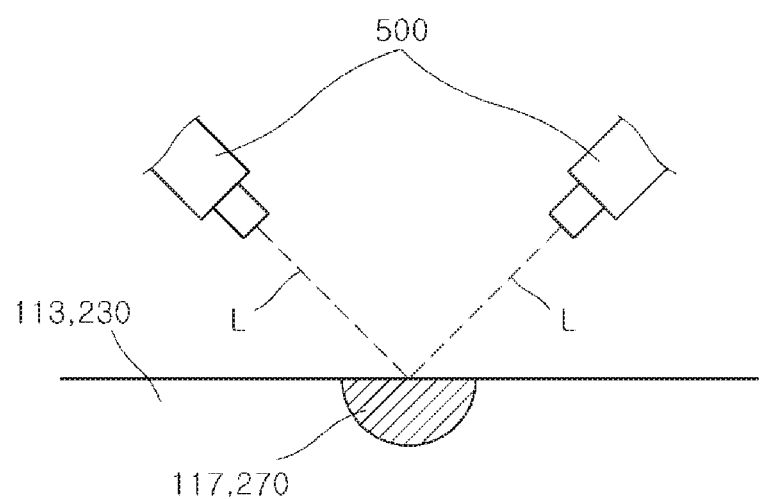
FIG. 9 is a view illustrating a state in which a heat treatment is performed by using a laser in the friction apparatus according to one embodiment of the present invention.

FIG. 9 is a view illustrating a state in which a heat treatment is performed by using a laser in the friction apparatus according to one embodiment of the present invention. Referring to FIG. 9, in the present embodiment, the hardened portions 117 and 270, that is, the first hardened portions 117 and the second hardened portions 270, may be formed using emission of a plurality of lasers L.

Accordingly, in the friction apparatus 1 according to the present embodiment, as the hardened portions 117 and 270 are formed by a plurality of laser emitting apparatuses 500 using emission of the plurality of lasers L even when a high cost and output laser apparatus is not applied thereto, a manufacturing cost decreases, and damage to the apparatus due to the high output laser is prevented.

In addition, the first hardened portions 117 and the second hardened portions 270 may be formed by respectively hardening the first surface 101 and the second surface 201 through a method of induction heating.

Figure 10:
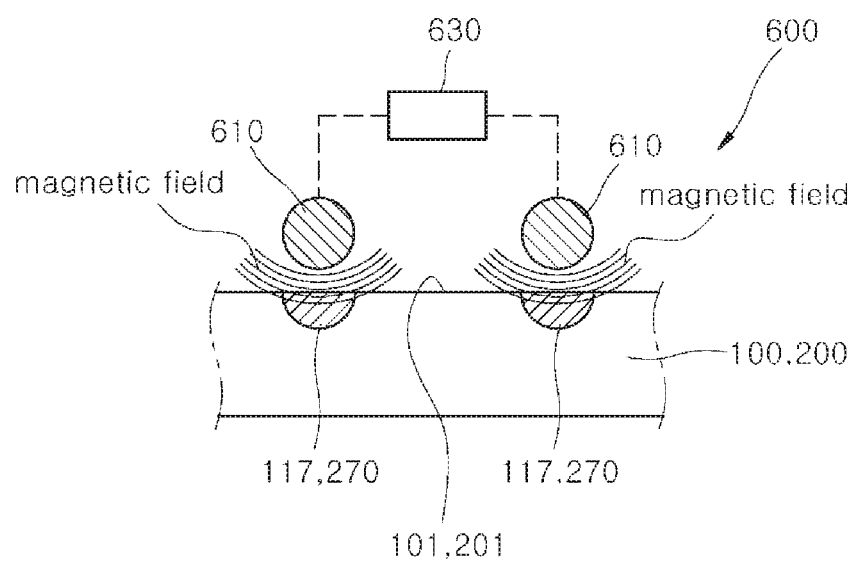
FIG. 10 is a view illustrating a state in which a heat treatment is performed by induction heating in the friction apparatus according to one embodiment of the present invention.

FIG. 10 is a view illustrating a state in which a heat treatment is performed by induction heating in the friction apparatus according to one embodiment of the present invention.

Referring to FIG. 10, when an induction coil 610 of an induction heating apparatus 600 is positioned on a circumferential surface on which the hardened portions 117 or 270 are formed in a state in which the first member 100 or the second member 200 is firmly fixed to a jig and the like and a power source 630 of the induction heating apparatus 600 applies a high frequency current thereto, a current is induced in the first or second surface 101 or 201, and the first or second surface 101 or 201 is resistance-heated to harden the hardened portions 117 or 270.

Accordingly, the friction apparatus 1 according to the present embodiment may be formed through a method in which the area, the length d1, or the width of the hardened portion 117 or 270 or the distance d2 or d2' between the hardened portions 117 or 270 are adjusted by adjusting a shape of the induction coil 610 of the induction heating apparatus 600 and an output and a frequency of the high frequency current thereof.

The hardened portions 117 and 270 may be formed through various methods such as a heating method using heat generated when a gas and the like are burned, a method of heating the first surface 101 or the second surface 201 by heating a medium at a high temperature and positioning the medium to be in contact with the first surface 101 or the second surface 201, and the like in addition to the emission of the lasers L and the induction heating methods described above.

As a region toward which the lasers L are emitted or which is heated by a vibrating portion is martensitically transformed after an increase in temperature, a hardness of the region increases in comparison to an unheated region and a toughness of the region is increased through a post treatment.

Each of the hardened portions 117 and 270 with the increased hardness serves as a protrusion while the first member 100 and the second member 200 rub to increase the adhesion coefficient, which is the friction coefficient between the first member 100 and the second member 200.

The shape, distance, numbers, and the like of each of the first hardened portions 117 and the second hardened portions 270 may vary according to a material, a required adhesion coefficient, and the like of each of the first member 100 and the second member 200.

As the second member 200 illustrated as the wheel member is rotatably coupled to the vehicle body member 300, the vehicle body member 300 moves on the first member 100 illustrated as the rail member according to rotation of the second member 200.

In the present embodiment, the vehicle body member 300 receives power from an electric car line 30 through a pantograph 70 and moves on the rail portion 110 by rotating the second member 200 using the received power.

In the case in which the hardened portions 117 and 270 are respectively formed in the first member 100 illustrated as the rail member and the second member 200 illustrated as the wheel member, there is an effect of reducing noise.

Figure 11:
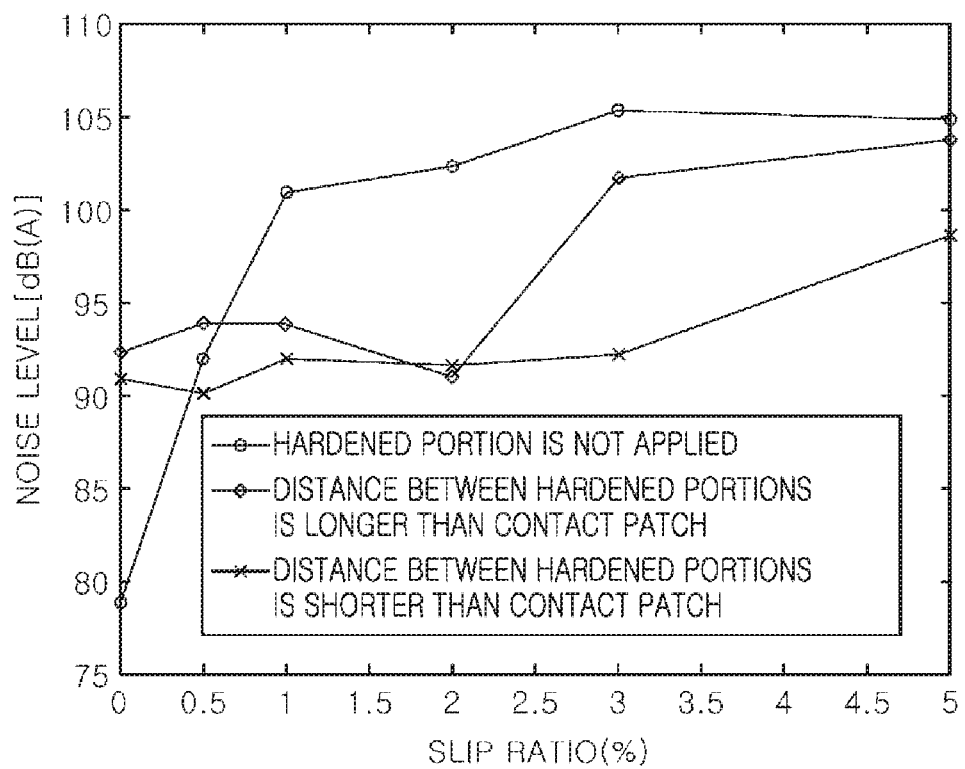
FIG. 11 is a comparative graph showing noise levels according to whether the hardened portions are applied to the friction apparatus and the distance between the hardened portions in the friction apparatus according to one embodiment of the present invention.

FIG. 11 is a comparative graph showing noise levels according to whether the hardened portions are applied to the friction apparatus and the distance between the hardened portions in the friction apparatus according to one embodiment of the present invention.

Referring to FIG. 11, in the case in which a slip ratio between the first member 100 and the second member 200 is small (less than 0.5%), noise is smaller when the hardened portions 117 and 270 are not applied to the first member 100 and the second member 200 than when the hardened portions 117 and 270 are applied thereto, in the case in which the slip ratio is about 0.5%, the noises are similar therebetween, and in the case in which the slip ratio is greater than 1%, the noise is lower when the hardened portions 117 and 270 are applied thereto than when the hardened portions 117 and 270 are not applied thereto by as much as 10 dB or more.

FIGS. 12A, B and C shows comparative graphs showing noise levels according to whether the hardened portions are applied to the friction apparatus and the distance when a slip ratio of the friction apparatus according to one embodiment of the present invention is 2%.

Referring to FIG. 12A, in the case in which the slip ratio is 2%, a noise value is more than 100 dB when the hardened portions 117 and 270 are not applied to the friction apparatus, and the noise value is about 90 dB when the hardened portions 117 and 270 are applied thereto.

In the case in which the hardened portions 117 and 270 are applied to the friction apparatus, although noise of 30 Hz or less slightly increases and a high frequency portion increases, since the increased noise is small compared to overall noise and noise in range of 400 to 1000 Hz is very small, there is an effect of reducing the overall noise.

Hereinafter, operation principles and effects of the friction apparatus 1 according to one embodiment of the present invention will be described.

After the rail portion 110 or the second member 200 is fixed to a fixing jig and the like, lasers L are emitted toward the rail portion 110 or the second member 200 using the plurality of laser emitting apparatuses 500. A region toward which the lasers L are emitted is martensitically transformed after an increase in temperature such that a hardness of the region increases in comparison to a region toward which the lasers L are not emitted, and a toughness of the region increases through a post treatment.

Each of the hardened portions 117 and 270 with an increased hardness serves as a protrusion to increase the stick zone between the second member 200 and the rail portion 110 when the railway vehicle is running.

The shapes, distance, numbers, and the like of each of the first hardened portions 117 and the second hardened portions 270 may vary according to a material, a required adhesion coefficient, and the like of each of the rail portion 110 and the second member 200, a specification of the vehicle body member 300, and the like.

Accordingly, in the friction apparatus 1 according to the present embodiment, since the hardened portions 117 and 270 are respectively applied to the first member 100 and the second member 200 which are in contact with each other and move relative to each other, an adhesion coefficient can be improved, and generation of wear and noise of the apparatus can be reduced.

In addition, in the friction apparatus 1 according to the present embodiment, since patterns applied to the hardened portions 117 and 270 and the distances between the hardened portions 117 and 270 are adjusted, the adhesion coefficient and noise can be controlled.

In addition, in the friction apparatus 1 according to the present embodiment, since the adhesion coefficient between the rail portion 110 and the second member 200 increases, the railway vehicle can stably run on the inclined sections B and D and accidents can be prevented by securing a braking force in case of emergency.

In addition, in the friction apparatus 1 according to the present embodiment, since the heat treatment is performed by using the plurality of lasers L, the hardening treatment can be performed by using the relatively low price and low power output (about 500 W) laser emitting apparatus 500, and since the plurality of first hardened portions 117 or second hardened portions 270 are applied to the friction apparatus 1, braking performance and the like of the railway vehicle can be improved.

In addition, in the friction apparatus 1 according to the present embodiment, since the first hardened portions 117 or the second hardened portions 270 are applied to the friction apparatus 1, a plastic flow of the rail portion 110 or the second member 200 is suppressed, and thus a wear resistance and a fatigue resistance of the rail portion 110 or the second member 200 can be improved.

In addition, in the friction apparatus 1 according to the present embodiment, since the distance d2 between the plurality of first hardened portions 117 or the distance d2' between the plurality of second hardened portions 270 is less than the longitudinal length d3 of a region of the contact patch P, noise can be reduced.

In addition, in the friction apparatus 1 according to the present embodiment, since the adhesion coefficient can be maintained not to be decreased even when a relative speed between the rail portion 110 and the wheel member is high, noise, wear, and friction energy generated between the rail portion 110 and the wheel member can be reduced.

In addition, in the friction apparatus 1 according to the present embodiment, since the adhesion coefficient between the rail portion 110 and the wheel member is within a predetermined range, noise, wear, and friction energy generated between the rail portion 110 and the wheel member can be reduced.

In addition, in the friction apparatus 1 according to the present embodiment, since the distance d2 or d2' between the central portions of the first hardened portions 117 or the central portions of the second hardened portions 270 is greater than the longitudinal length d3 of the contact patch P of the first member 100 or the second member 200, the adhesion coefficient between the first member 100 and the second member 200 is within a set range, and thus noise, wear, and friction energy generated between the first member 100 and the second member 200 can be reduced.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A friction apparatus comprising:
a first member including a first surface; and
a second member including a second surface in contact with the first surface and configured to move while in contact with the first member,
wherein the first member includes one or more first hardened portions hardened by performing a heat treatment on the first surface, the one or more first hardened portions being disposed on the first surface,
wherein the one or more first hardened portions on the first surface are disposed to be spaced the same distance from each other.

2. The friction apparatus of claim 1, wherein a distance between the plurality of first hardened portions on the first surface is greater than a length of a contact patch, which is an instant contact area between the first member and the second member.

3. The friction apparatus of claim 1, wherein a distance between the plurality of first hardened portions on the first surface is less than a length of a contact patch, which is an instant contact area between the first member and the second member.

4. The friction apparatus of claim 1, wherein the second member includes one or more second hardened portions hardened by performing a heat treatment on the second surface.

5. The friction apparatus of claim 4, wherein a plurality of second hardened portions are provided and disposed on the second surface.

6. The friction apparatus of claim 5, wherein the plurality of second hardened portions on the second surface are disposed to be spaced the same distance from each other.

7. The friction apparatus of claim 5, wherein a distance between the plurality of second hardened portions on the second surface is greater than a length of a contact patch, which is an instant contact area between the first member and the second member.

8. The friction apparatus of claim 5, wherein a distance between the plurality of second hardened portions on the second surface is less than a length of a contact patch, which is an instant contact area between the first member and the second member.

9. The friction apparatus of claim 5, wherein a friction coefficient between the first member and the second member is controlled by adjusting a distance between the plurality of first hardened portions or between the plurality of second hardened portions.

10. The friction apparatus of claim 4, wherein the first member includes a rail member including a rail portion.

11. The friction apparatus of claim 10, wherein the rail portion includes:
a rail base portion coupled to a fixed object;
a rail head portion including the first surface on which the first hardened portions are formed and configured to be in contact with the second member; and
a rail connection portion which connects the rail base portion and the rail head portion.

12. The friction apparatus of claim 10, wherein the second member includes a wheel member configured to rotate while in contact with the first member.

13. The friction apparatus of claim 12, wherein the second member includes:
an axle coupling portion coupled to an axle;
a rail contact portion which surrounds the axle coupling portion and is in contact with the rail portion, and on which the second hardened portions are intermittently disposed; and
a wheel flange portion formed to extend from the rail contact portion and configured to be in contact with a side surface of the rail portion.

14. The friction apparatus of claim 13, wherein the second hardened portions are disposed on an outer circumferential surface of the rail contact portion in a circumferential direction.

15. The friction apparatus of claim 1, wherein:
the first member includes a rail member including a rail portion; and
the second member includes a wheel member including a rail contact portion in contact with an upper surface of the rail portion,
wherein a friction coefficient between the upper surface of the rail portion and the rail contact portion is greater than 0.25 and less than 0.40.

* * * * *